No. 895,303. PATENTED AUG. 4, 1908.
C. B. ROSENBERGER.
PUZZLE.
APPLICATION FILED MAR. 2, 1908.
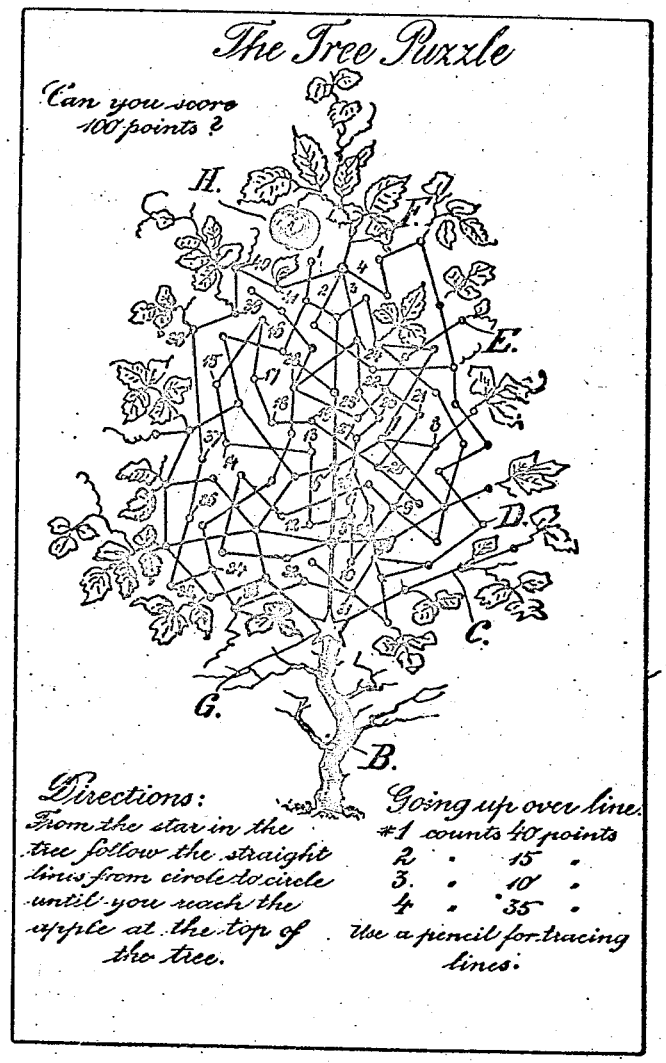
Witnesses
A. H. Rabsag
O. N. Butler
Inventor
C. B. Rosenberger,
By H. C. Everett
Attorneys

UNITED STATES PATENT OFFICE.

CHARLES B. ROSENBERGER, OF PITTSBURG, PENNSYLVANIA.

PUZZLE.

No. 895,303.  Specification of Letters Patent.  Patented Aug. 4, 1908.

Application filed March 2, 1908. Serial No. 418,789.

*To all whom it may concern:*

Be it known that I, CHARLES B. ROSENBERGER, a citizen of the United States of America, residing at Pittsburg, in the county of Allegheny and State of Pennsylvania, have invented certain new and useful Improvements in Puzzles, of which the following is a specification, reference being had therein to the accompanying drawing.

This invention relates to puzzles, and the object of my invention is to provide a puzzle that will require considerable labor and skill to solve, the puzzle requiring the person's undivided attention and thought in order to reach the climax or solve the puzzle.

My puzzle is printed on a backing or card such as a postal card together with directions, and it can be used as a game with a number of participants, each of which can solve the puzzle with a certain score to their credit.

The puzzle is in the form of a tree representation having numerous branches or limbs, which are represented by intersecting straight lines connected by circles. Some of the lines are what I term "blanks" and are misleading, while other lines lead to the top of the tree. These lines I term "successful" lines and are designated by numerals, each numeral representing so many score points.

When my puzzle is used as a game, the participant scoring the largest number of points is the winner of the game.

My invention will be hereinafter described in detail and reference will now be had to the drawing forming a part of this specification wherein I have illustrated one side of an enlarged postal card, having printed or otherwise marked thereon my puzzle.

Upon the card A is printed the representation of a tree, the reference character B designating the trunk thereof from which radiates a plurality of limbs or branches, represented by intersecting straight lines C, some of which are connected by stations herein shown as in the form of circles D, while blank lines are provided with stations E also shown in the form of circles and constituting the terminals of the blank lines.

The "successful" lines designated 1—2—3—4, terminate in line F which solves the puzzle, but as it will hereinafter appear, it requires considerable skill to trace over lines that lead and connect with the "successful" lines 1 to 4 inclusive.

Beneath the representation of the tree, at one side thereof I print the directions, while at the opposite side thereof, I print a score schedule.

As a starting point for my puzzle or game, I have illustrated a star G upon the trunk B of the tree and at the top of the tree I represent an apple H. Figuratively speaking, to solve the puzzle one must start at the star and climb over various limbs or branches to obtain the apple or goal H at the top of the tree. The directions are therefore as follows, "from the star in the tree follow the straight lines from circle to circle until you reach the apple at the top of the tree". The score schedule reads as follows, "Going up over line #1 counts 40 points, line #2 counts 15 points, line #3 counts 10 points, and line #4 counts 35 points.

Beneath the score schedule I place a notice advising the use of a pencil for tracing the lines.

As an example for solving the puzzle, I herewith set forth the manner of solving the same over the "successful" lines 1 and 3. By starting at the star G, and passing over circles 5, 6, 7, 8, 9, 10, 11, 12, 13, 14, 15, 16, 17, 18, 19, 20, 21, 22, 23 and 24 the "successful" line 3 is reached. This procedure scores 10 points. Now upon reaching the circle 24, if circles 25, 26, 27, 28, 29, 30, 31, 32, 33, 34, 35, 36, 37, 38, 39, 40 and 41 are followed, the line 1 can be reached, this procedure scores 40 points.

It will be observed that when passing over numerous of the above mentioned circles, that it is an easy matter to be led upon a "blank" line or returned to the original starting point.

It is thought that my invention will be fully understood from the two examples cited and I reserve the right to use any number of lines or configurations that have in view the same end as my invention. The tree can be represented in natural colors and may be of a different design or contour than that illustrated. In other words, I desire to make any changes in my invention as are permissible by the appended claims.

Having now described my invention what I claim as new, is;—

1. A puzzle, comprising a pictorial representation of the trunk and terminal twigs or leaves of a tree, and having within such representation a series of circles and a series of differently directed and intersecting straight lines representing the limbs of the tree, some of said circles being connected to more than one line and others forming the terminals of lines, and one of the lines being connected to a goal.

2. A puzzle, comprising a pictorial representation of a part of a tree, and having within such representation a series of designations representing stations and a series of differently directed and intersecting lines representing the limbs of the tree, some of said stations being connected to more than one line and others forming the terminals of lines and one of the lines being connected to a goal.

3. A puzzle comprising a pictorial representation of a part of a tree, and having within such representation a series of designations representing stations and a series of differently directed and intersecting lines representing the limbs of the tree, some of said stations being numbered and some of them being connected to more than one line and others forming the terminals of lines and one of the lines being connected to a goal.

In testimony whereof I affix my signature in the presence of two witnesses.

CHARLES B. ROSENBERGER.

Witnesses:
 MAX H. SROLOVITZ,
 A. J. TRIGG.